(12) United States Patent
Shirasaka

(10) Patent No.: US 6,381,858 B1
(45) Date of Patent: May 7, 2002

(54) METHOD FOR CALCULATING GYROSCOPIC WELLBORE SURVEYS INCLUDING CORRECTION FOR UNEXPECTED INSTRUMENT MOVEMENT

(75) Inventor: Ichiro Shirasaka, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/668,787

(22) Filed: Sep. 22, 2000

(51) Int. Cl.[7] ............................................. E21B 47/022
(52) U.S. Cl. ....................................................... 33/304
(58) Field of Search .......................... 33/302, 303, 304, 33/313

(56) References Cited

U.S. PATENT DOCUMENTS

| | | | |
|---|---|---|---|
| 4,454,756 A | | 6/1984 | Sharp et al. ................... 33/313 |
| 4,698,911 A | * | 10/1987 | Rambow ...................... 33/302 |
| 4,987,684 A | | 1/1991 | Andreas et al. ................ 33/304 |
| 5,435,069 A | * | 7/1995 | Nicholson ...................... 33/313 |
| 6,076,268 A | * | 6/2000 | Fuhr ............................ 33/304 |
| 6,179,067 B1 | * | 1/2001 | Brooks ......................... 33/304 |

* cited by examiner

*Primary Examiner*—G. Bradley Bennett
(74) *Attorney, Agent, or Firm*—J. L. Jennie Salazar

(57) ABSTRACT

A method for calculating a gyroscope survey is disclosed. The method includes measuring outputs of gyroscopes and accelerometers in a survey instrument. An instrument rotational movement is determined from the outputs of the gyroscopes. If the rotational movement exceeds a predetermined threshold, an instrument attitude is calculated from the gyroscope measurements, using the most recent alignment measurement to initialize the attitude measurement. Instrument alignment is calculated from the output of the accelerometers and gyroscopes when the threshold is not exceeded. In one embodiment, alignment is calculated using Kalman filtering. In a particular application, azimuth and inclination of a wellbore are determined at selected positions from the alignment and/or attitude measurements. The wellbore azimuth and inclination are used in one embodiment to calculate the wellbore trajectory along its length.

12 Claims, 3 Drawing Sheets

METHOD FOR CALCULATING GYROSCOPIC WELLBORE SURVEYS INCLUDING CORRECTION FOR UNEXPECTED INSTRUMENT MOVEMENT

FIELD OF THE INVENTION

This invention relates generally to the field of inertial navigation instruments. More specifically, the invention relates to methods for determining orientation of an inertial navigation instrument disposed in a wellbore drilled through earth formations

BACKGROUND OF THE INVENTION

Directional wellbores are drilled through earth formations along a selected trajectory. The selected trajectory deviates from vertical at selected inclination angles and at selected azimuth (geographic reference) directions along the length of the wellbore. It is necessary to measure the inclination and azimuth of the wellbore during drilling to determine whether the selected trajectory is being maintained. Typically, a so-called directional survey is performed to measure the inclination and azimuth at selected positions along the wellbore. A directional survey is often performed by inserting a survey instrument into a drilling tool assembly, and moving the drilling tool assembly into or out of the wellbore. At selected intervals, usually about every 90 feet (30 meters), the drilling tool assembly having the instrument therein is stopped so that a survey measurement can be made. The survey instrument includes sensors which generate measurements corresponding to the instrument orientation with respect to the geographic reference and to earth's gravity. Azimuth and inclination are determined from the instrument orientation. The measurements of azimuth and inclination at each survey location are then entered into any one of a number of well known calculation methods to determine the wellbore trajectory along its entire length.

Many types of surveying instruments are known in the art for measuring the inclination and azimuth of the wellbore. One type of instrument uses gyroscopes in one form or another to establish the geographic reference with respect to the survey instrument, and uses accelerometers to determine the orientation of the instrument with respect to the earth's gravity (vertical). Types of gyroscope-based instruments used for wellbore surveying are described, for example, in U.S. Pat. No. 4,454,756 issued to Sharp et al. and in U.S. Pat. No. 4,987,684 issued to Andreas et al. As is known in the art, certain gyroscope types generate a signal output which is related to the angular velocity of the gyroscope about its sensitive axis. Measurements of the angular velocity can be integrated to provide rotational displacement of the gyroscope about its axis. Rotational displacement can be used to determine rotational orientation of the instrument.

A particular type of gyroscope-based survey instrument is known in the art as a "strapdown" instrument. Strapdown instruments have gyroscopes which are fixed to the instrument housing or frame, and determine the geographic reference by measuring components, usually along three orthogonal axes, of the earth's rotation about its axis. The orientation of the earth's rotation vector with respect to the instrument is used in conjunction with the orientation of the instrument with respect to gravity to determine the wellbore azimuth and inclination.

Measuring the components of the earth's rotation is difficult because the rotation rate of the earth is relatively small. Typically, it is necessary in wellbore surveying to hold the instrument steady (substantially motionless) for at least a minimum measurement time to enable determination of the earth's rotation component in each of the gyroscope signals. As is known in the art, the minimum measurement time is related to, among other factors, the amount of noise in the output of the particular type of gyroscope used. Frequently, gyroscope instruments are subject to movement during a survey measurement. Such movement can be caused by, among other factors, careless operation of the drilling tool assembly, and motion of the drilling tool assembly because of ocean waves where the wellbore is drilled from a floating vessel in the ocean. When the survey instrument is moved during a measurement period, the instrument may be subject to momentary high angular acceleration. Such angular acceleration can make survey computations inaccurate or useless. However, the opportunity to determine the wellbore inclination and azimuth at the particular location may be very important to maintaining the wellbore along its intended trajectory.

What is needed is a method for calculating wellbore surveys from gyroscopic measurements which can take account of, and at least partially correct for, instrument movement during a survey measurement.

SUMMARY OF THE INVENTION

The invention is a method for calculating a gyroscope survey. The method includes measuring outputs of gyroscopes and accelerometers in a survey instrument. An instrument rotational movement is determined from the outputs of the gyroscopes. If the rotational movement exceeds a predetermined threshold, an instrument attitude is calculated from the gyroscope measurements, using the most recent alignment measurement to initialize the attitude measurement. Instrument alignment is calculated from the output of the accelerometers and gyroscopes when the threshold is not exceeded.

In one embodiment of the invention, the instrument alignment is calculated using Kalman filtering. In one embodiment, the rotation of the instrument is determined by measuring a root sum square average of the gyroscope outputs.

In a particular application of the method, the azimuth and inclination of a wellbore are determined at selected positions along the wellbore from the alignment and/or attitude measurements. The wellbore azimuth and inclination are used in one embodiment to calculate the wellbore trajectory along its length. One embodiment of the trajectory calculation includes performing a minimum curvature calculation.

DETAILED DESCRIPTION OF THE INVENTION

Figure 1:
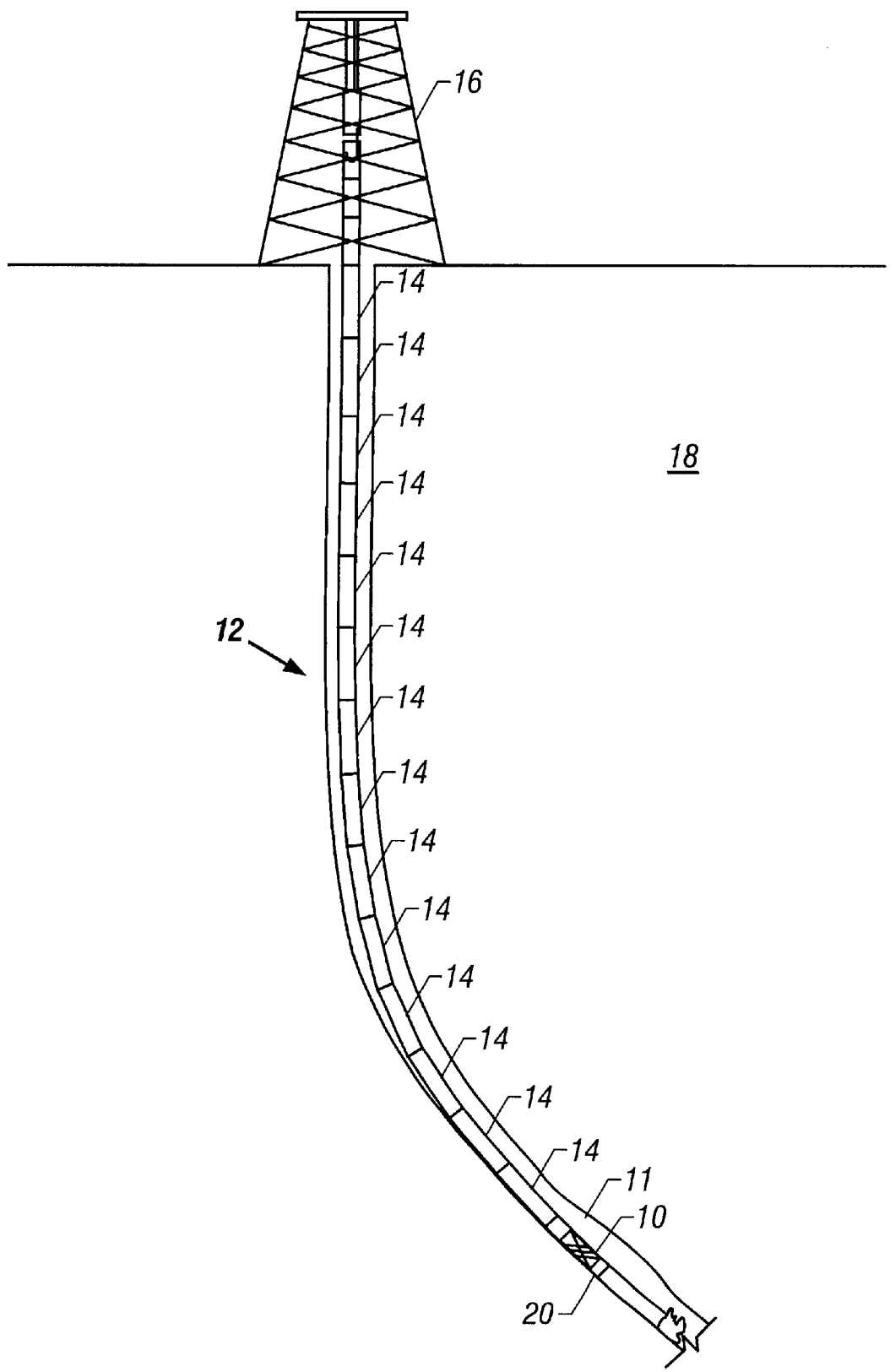
FIG. 1 shows an example of a gyroscopic survey instrument within a drilling tool assembly as it is typically used in a wellbore drilled through earth formations.

FIG. 1 shows in general form, an example of a gyroscope-type directional survey instrument 10 disposed in a wellbore 11 drilled through earth formations 18. The wellbore 11 is intended to follow a selected trajectory. The wellbore 11, as is known in the art, is drilled using a drilling tool assembly 12 which may include threadedly coupled segments of pipe, shown generally at 14, which are inserted into and withdrawn from the wellbore 11 by a rig 16 or similar device known in the art. Typically, the survey instrument 10 is inserted into a specialized segment of pipe called a drill collar, shown generally at 20, whose position in the drilling tool assembly 12 is known. Gyroscopes and accelerometers (not shown in FIG. 1) in the instrument 10 make measurements corresponding to the rotary orientation of the instrument 10 with respect to geographic north and the earth's gravity. Typically, the drilling tool assembly 12 will be stopped during insertion and/or retrieval from the wellbore 11 at selected positions, usually every 90 feet (roughly 30 m), corresponding to the length of a "stand" of the pipe segments 14, so that the instrument 10 can make measurements that can be accurately converted to the "alignment" of the instrument 10 with respect to geographic north and the earth's gravity. The alignment measurements are used to calculate azimuth and inclination of the wellbore 1 at the selected positions. As is well known in the art, the trajectory of the wellbore 11 along its entire length can be calculated from the azimuth and inclination measurements made at the selected positions using calculation methods such as "minimum curvature". The term "alignment" will be further explained.

Figure 2:
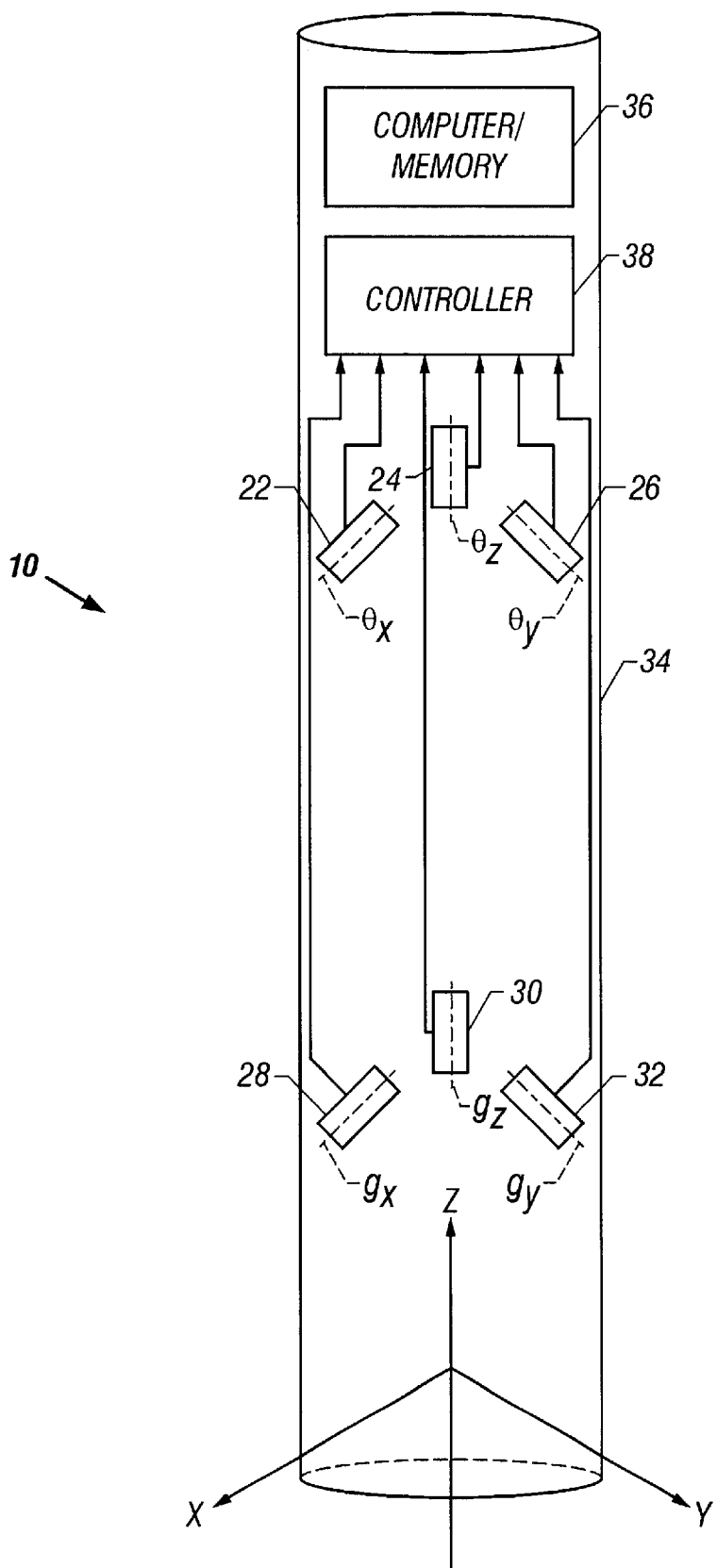
FIG. 2 shows the example gyroscope survey instrument of FIG. 1 in more detail.

The survey instrument is shown in more detail in FIG. 2. Typically the instrument includes a pressure resistant housing 34, inside which are disposed three gyroscopes 22, 24, 26 and three accelerometers 28, 30, 32. Measurements made by the three gyroscopes 22, 24, 26 and three accelerometers 28, 30, 32 are sampled at time intervals and for durations programmed by a controller 38. The measurements may be converted or processed according to an embodiment of the method of the invention by a computer 36 disposed in the instrument housing 34 and/or recorded in a memory which may be separate or form part of the computer 36. The actual configuration of the controller 38 and computer/memory 36 used in any particular survey instrument may be different from the one shown in FIG. 2, and therefore the example instrument shown in FIG. 2 is not meant to limit the scope of the invention. Moreover, it is not essential that the calculations performed according to the method of the invention be performed in the instrument computer 36. The measurements made by the three gyroscopes 22, 24, 26 and three accelerometers 28, 30, 32 may be recorded in the memory or other storage device in the instrument 10 and processed when the instrument 10 is retrieved from the wellbore (11 in FIG. 1). Alternatively, the instrument 10 may be of a configuration adapted to be conveyed into the wellbore by armored electrical cable (not shown in FIG. 2), so that signals from the gyroscopes and accelerometers can be transmitted along the cable to a recording/processing system (not shown) disposed at the earth's surface.

In the instrument shown in FIG. 2, the gyroscopes 22, 24, 26 are fixedly mounted to the instrument 10, so that their sensitive axes are orthogonal to each other. The sensitive axes are indicated are $\theta_x$, $\theta_z$, $\theta_y$ respectively. In this embodiment, the axis of gyroscope 24, $\theta_z$, is disposed substantially parallel to the instrument axis z. The other two gyroscope axes, $\theta_x$ and $\theta_y$, are positioned substantially parallel to corresponding axes x and y, as shown in FIG. 2, lying in a plane normal to the axis of the instrument z. Similarly, the three accelerometers 28, 30, 32 are fixedly mounted in the instrument so that their sensitive axes, $g_x$, $g_z$, $g_y$, respectively, are substantially parallel to corresponding axes x, z, and y. Although the example instrument 10 shown in FIG. 2 includes orthogonally mounted accelerometers and gyroscopes, it should be clearly understood that any other suitable arrangement of accelerometers and gyroscopes which can resolve the components of the earth's (and instrument) rotation and earth's gravity can be used in the invention. Such arrangements are known in the art and are typically referred to as "skewed" arrangements.

In the method of the invention, two types of instrument orientation calculations are performed. One of these is referred to as the "alignment". An alignment measurement is used to determine the relative orientation of the instrument 10 along its three orthogonal axes using measurements corresponding to the direction of the earth's rotation vector and the earth's gravity. Alignment measurement is intended to be performed while the instrument 10 is substantially stationary. Methods for calculating the alignment are known in the art. In this embodiment of the invention, the method for calculating alignment is described in, Neal S. R. et al., *Self-Alignment of a Gimballess Inertial Navigation System*, publication no. NWC-TP-4463, China Lake Naval Weapons Center, 1968. Generally speaking, alignment is performed by holding the instrument 10 in fixed position for at least a minimum alignment measurement time. The measurements from the gyroscopes and accelerometers are processed through a Kalman filtering process, such as in the Neal et al reference to calculate the pitch, roll, and yaw of the instrument with respect to geographic north and vertical. Pitch refers to the angle subtended between the instrument axis and vertical (direction of earth's gravity). Roll refers to the rotary orientation about the instrument axis with respect to vertical. More commonly, roll is known as "toolface", and represents an angle subtended between a selected reference on the instrument housing and either the gravitationally uppermost wall of the wellbore or geographic north. Yaw is the angle subtended between the instrument axis and geographic north, projected into a horizontal plane.

The other type of measurement is referred to as "attitude". Attitude measurement determines the orientation of the instrument by measuring the instrument rotation about its orthogonal axes from an initial orientation. Typically such instrument rotation measurement is performed by integrating the rotational velocity measurements made by each of the three gyroscopes 22, 24, 26 in the instrument 10, subtracting from each rotational velocity measurement a projected component of the earth's rotation. A method for calculating the attitude of the instrument used with this embodiment of the invention is described in, Nurse, R. J. et al., *A New Baseline for the Inertial Navigation Strapdown Simulator Program*, Vols. I–IV, R-1136, Charles Stark Draper Laboratory, Inc., Cambridge, Mass., 1978.

In a survey calculation method according to the invention, movement of the instrument 10 about any of its axes is detected by measuring changes in the outputs of the gyroscopes 22, 24, 26. When instrument movement which exceeds a preselected threshold is detected, the calculation of the instrument alignment is stopped, and calculation of the attitude is initiated. The calculation of the attitude is initialized using the most recent calculation of alignment.

In one embodiment of the invention, movement of the instrument is detected by calculating a mean norm of the instrument angular velocity vector with respect to the inertial space. More specifically, in this embodiment a root sum square of the averaged measurements made by the three gyroscopes 22, 24, 26 is determined. As shown below, where the k-th angular displacement about each of the gyroscopes is calculated according to the expression:

$$\Delta \theta_k^b = [\Delta \theta_k^x \Delta \theta_k^y \Delta \theta_k^z]^T$$

where T represents a matrix transpose, then the k-th angular orientation can be calculated by the expressions:

$$\theta_k^i = \theta_{k-1}^i + \Delta\theta_k^i \text{(for i=x, y, z)} \quad (1)$$

and $$t_k = t_{k-1} + \Delta t, \quad (2)$$

where $\Delta t$=the gyroscope and accelerometer sample interval. A root sum square average for the k-th measurements of incremental angular displacement can be calculated according to the expression:

$$\overline{\Omega}_k = \frac{\sqrt{(\Delta\theta_k^x)^2 + (\Delta\theta_k^y)^2 + (\Delta\theta_k^z)^2}}{t_k}. \quad (3)$$

A differential angular displacement (also referred to as instrument rotation rate) can be calculated for the k-th measurement interval according to the expression:

$$\delta\Omega_k = |\overline{\Omega}_k - \Omega_{ie}|, \quad (4)$$

where $\Omega_{ie} = 0.72721 \times 10^{-4}$ radians per second (the earth's rotation rate).

$\tau_a$ represents the previously described minimum alignment time, and $t_k^a$ represents the actual alignment time (not necessarily $t_k = t_k^a$) at the k-th measurement interval. The term $\Delta\Omega$ represents a predetermined threshold for the angular motion (rotation) of the instrument. If the angular rotation rate of the instrument exceeds the threshold, the instrument calculation mode is switched from "alignment mode" to "attitude mode".

Figure 3:
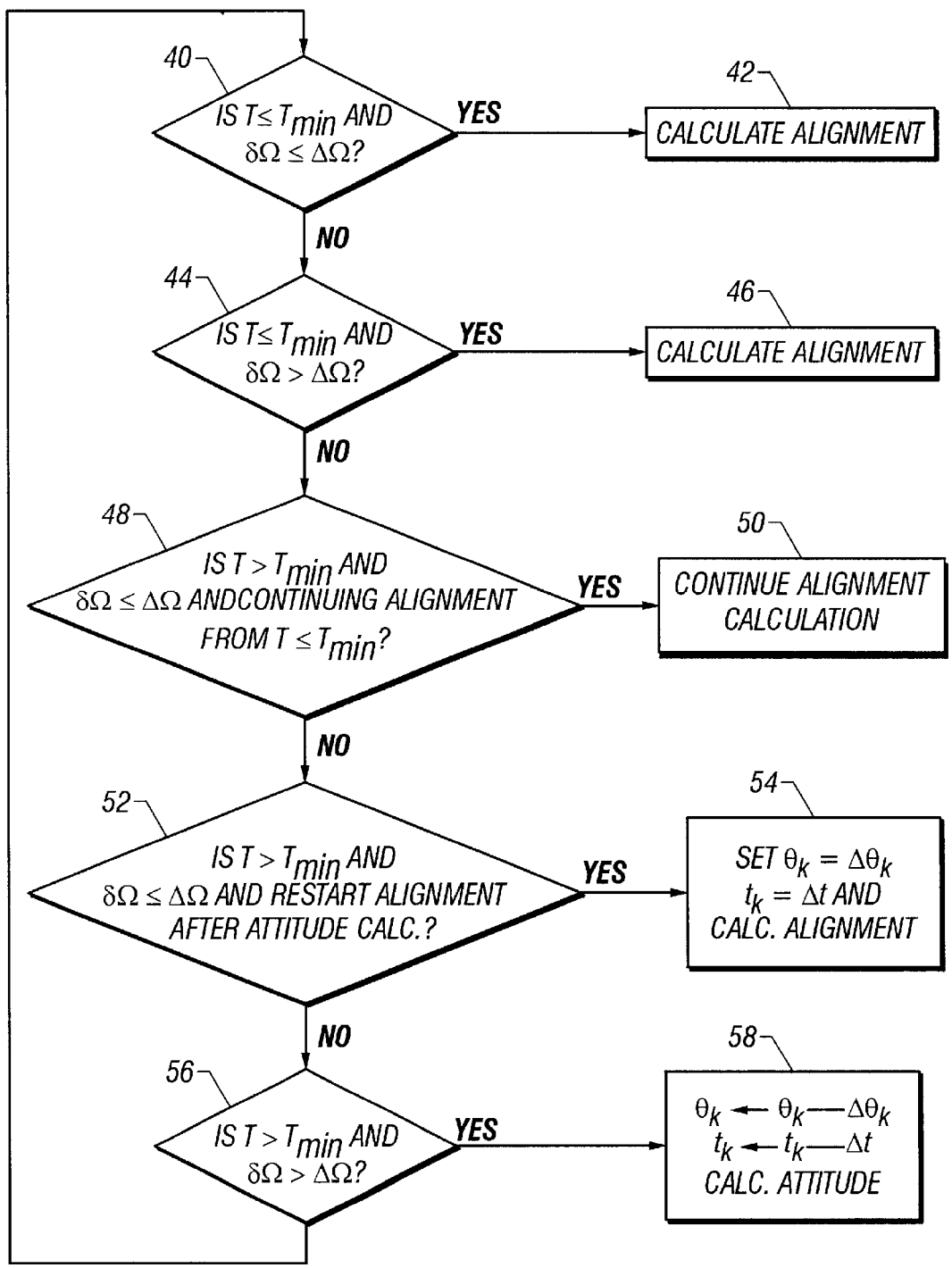
FIG. 3 shows a flow chart of one embodiment of the invention.

In the method according to the invention, and referring to FIG. 3, the following process is performed:

(c1) If the actual measurement time is less than or equal to the minimum measurement time $t_k^a \leq \tau_a$ and the rotation rate is less than or equal to the threshold value, $\delta\Omega_k \leq \Delta\Omega$, as shown at 40 then an alignment calculation is performed, shown at 42.

(c2) If the actual measurement time is less than or equal to the minimum measurement time, $t_k^a \leq \tau_a$ and the rotation rate is greater than the threshold $\delta\Omega_k \leq \Delta\tau$, as shown at 44, then an alignment calculation is performed, as shown at 46.

(c3) If the actual measurement time is greater than the minimum measurement time, $t_k^a > \tau_a$ and the rotation rate is less than or equal to the threshold value, $\delta\Omega_k \leq \Delta\tau$, and if continuing the alignment measurement from when $t_k^a \leq \tau_a$, as shown at 48, then the alignment calculation is continued, as shown at 50.

(c4) If the actual measurement time is greater than the minimum measurement time, $t_k^a > \tau_a$ and if the rotation rate is less than or equal to the threshold value, $\delta\Omega_k \leq \Delta\tau$, and if restarting the alignment calculation after a previous attitude calculation, as shown at 52, then set $\theta_k^i = \Delta\theta_k^i$ for i=x, y, z; $t_k = \Delta t$ ; and then perform the alignment calculation using the value of a direction cosine matrix transferred from the previous attitude measurement (initialize the alignment calculation using the previous attitude calculation), as shown at 54. Finally, (c5) If the actual measurement time is greater than the minimum measurement time, $t_k^a > \tau_a$ and if the rotation rate is greater than the value of the threshold, $\delta\Omega_k > \Delta\Omega$, as shown at 56, then, as shown at 58, initial conditions are set, $\theta_k^i \leftarrow \theta_k^i$ for i=x, y, z; and $t_k \leftarrow t_k - \Delta t$, where $\theta_k^i$ and $t_k$ on the right-hand side of these relationships are calculated according to equations (1) and (2), and an attitude is calculated. The value of the direction cosine matrix determined in the previous measurement period is used to initialize the calculation of the attitude calculation in this embodiment.

In the present embodiment, the minimum measurement time, $\tau_a = 15$ seconds, and the rotation rate threshold, $\Delta\Omega = 0.3$ degrees per hour. As previously explained, the minimum measurement time is related to the type and/or noise level of the particular gyroscopes used in the survey instrument. A value for the rotation rate threshold can be determined through simulation of the response of the survey instrument, or through laboratory experiment in which known values rotation rate are applied to a sample instrument. The rotation rate threshold value, $\Delta\Omega$, may be determined, for example, when a difference between the calculated alignment including and excluding the applied rotation rate to the instrument is within a selected error threshold. Therefore, the values of rotation rate threshold and minimum measurement time used in this embodiment are not intended to limit the invention.

The method of the invention provides a way to calculate directional surveys from gyroscope-based instrument measurements when the instrument is subjected to unexpected motion during a measurement interval. This reduces the chances of survey inaccuracy or failure in the event the instrument is subjected to careless handling or environmentally induced motion during a survey.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for calculating a gyroscope survey, comprising:

calculating an instrument rotational movement from outputs of gyroscopes in a survey instrument;

determining if the rotational movement exceeds a predetermined threshold; calculating an instrument alignment from output of accelerometers in the instrument and from the gyroscope outputs when the threshold is not exceeded; and calculating an attitude of the instrument if the threshold is exceeded, the attitude calculation initialized from an immediately previous calculation of instrument alignment.

2. The method as defined in claim 1 wherein the rotational movement is determined by calculating a root sum square average of the gyroscope outputs.

3. The method as defined in claim 1 wherein the alignment is determined by Kalman filtering the gyroscope and accelerometer outputs.

4. The method as defined in claim 1 wherein the accelerometers and gyroscopes are mutually orthogonal and a sensitive axis of one of the gyroscopes and accelerometers is substantially parallel to a longitudinal axis of the survey instrument.

5. The method as defined in claim 1 further comprising:

determining when the rotation rate drops below the threshold;

initializing a subsequent calculation of the alignment using a most recent calculation of the instrument attitude; and subsequently calculating the instrument alignment.

6. A method for surveying a wellbore, comprising:

inserting a survey instrument into the wellbore;

stopping the instrument at selected positions along the length of the wellbore;

measuring outputs of gyroscopes and accelerometers in the survey instrument;

calculating an instrument rotational movement from the outputs of the gyroscopes;

determining if the rotational movement exceeds a predetermined threshold;

calculating an instrument alignment from the output of the accelerometers and gyroscopes when the threshold is not exceeded;

calculating an attitude of the instrument if the threshold is exceeded, the attitude calculating initialized from a previous calculation of alignment of the instrument;

calculating a wellbore inclination and azimuth from the calculated attitude and alignment made at the selected positions.

7. The method as defined in claim 6 wherein the rotational movement is determined by calculating a root sum square average of the gyroscope outputs.

8. The method as defined in claim 6 wherein the alignment is determined by Kalman filtering.

9. The method as defined in claim 6 further comprising calculating a trajectory of the wellbore along its entire length from the calculated inclination and azimuth.

10. The method as defined in claim 9 wherein the calculating the trajectory is performed using a minimum curvature method.

11. The method as defined in claim 6 wherein the accelerometers and gyroscopes are mutually orthogonal and a sensitive axis of one of the gyroscopes and accelerometers is substantially parallel to a longitudinal axis of the survey instrument.

12. The method as defined in claim 6 further comprising:

determining when the rotation rate drops below the threshold;

initializing a subsequent calculation of the alignment using a most recent calculation of the instrument attitude; and subsequently calculating the instrument alignment.

* * * * *